United States Patent
Malhotra (10) Patent No.: US 6,912,279 B2
(45) Date of Patent: Jun. 28, 2005

(54) IDENTIFYING COMMUNICATIONS CHANNELS BETWEEN NODES

(75) Inventor: Yogesh Malhotra, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 10/085,819

(22) Filed: Feb. 25, 2002

(65) Prior Publication Data

US 2003/0161461 A1 Aug. 28, 2003

(51) Int. Cl.$^7$ ................................................ H04M 7/00
(52) U.S. Cl. .................. 379/230; 379/219; 379/221.08
(58) Field of Search ................................ 379/229, 230, 379/221.08–221.1, 207.02; 370/401, 352, 465, 522, 410

(56) References Cited

U.S. PATENT DOCUMENTS

| | | | |
|---|---|---|---|
| 6,738,472 B1 * | 5/2004 | Mayron ....................... | 379/229 |
| 2003/0007496 A1 * | 1/2003 | Brown et al. ................ | 370/401 |
| 2003/0169779 A1 * | 9/2003 | Craig .......................... | 370/522 |
| 2003/0189941 A1 * | 10/2003 | Christie et al. .............. | 370/410 |

OTHER PUBLICATIONS

International Telecommunications Union Telecommunication Standardization Section (ITU–T)– Signaling System No. 7 Q.761, ISDN user part functional description.

International Telecommunications Union Telecommunication Standardization Section (ITU–T)– Signaling System No. 7 Q.762, ISDN User Part general functions of messages and signals.

International Telecommunications Union Telecommunication Standardization Section (ITU–T)– Signaling System No. 7 Q.763, ISDN user part formats and codes.

International Telecommunications Union Telecommunication Standardization Section (ITU–T)– Signaling System No. 7 Q.764, ISDN user part signalling procedures.

American National Standards Institute– Signaling System No. 7 (T1.113) standard. Integrated Services Digital Network Digital Network (ISDN).

* cited by examiner

Primary Examiner—Benny Tieu
(74) Attorney, Agent, or Firm—Blakely, Sokoloff, Taylor & Zafman LLP (57) ABSTRACT

In a telecommunications network, a communication channel identifier agent (CCIA) is employed to identify communication channels. The CCIA directs the ISUP layer residing on a node to create Interface Identifiers (IntfIDs). The IntfIDs may contain an originating point code and a network identifier. The IntfIDs allow a node to use more than one originating point code to identify itself to other nodes in the telecommunications network. The IntfIDs are combined with circuit identification codes to identify communication channels between nodes in the telecommunications network.

28 Claims, 9 Drawing Sheets

IDENTIFYING COMMUNICATIONS CHANNELS BETWEEN NODES

FIELD

This invention relates to communication between nodes residing in one or more networks and more specifically to identifying communication channels between nodes.

BACKGROUND

Figure 1:
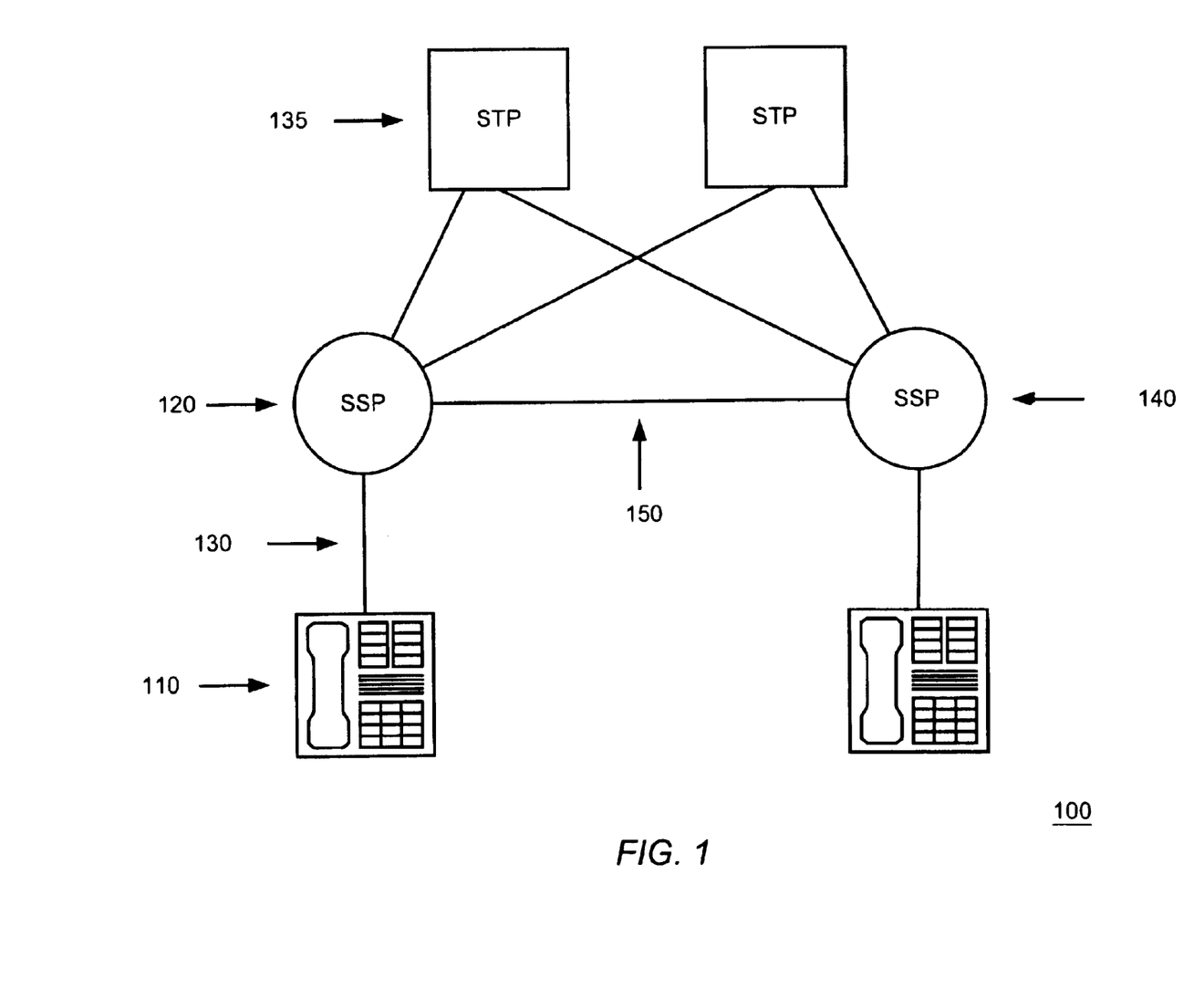
FIG. 1 is a block diagram of some of the elements of a telephone network.

FIG. 1 is a block diagram of some of the elements of telephone network 100. Telephone 110 connects to service switching point (SSP) 120 through subscriber line 130. Typically, subscriber line 130 is a twisted-pair of copper wires. SSP 120 contacts remote SSP 140 through signal transfer point (STP) 135 to reserve an idle trunk circuit. Direct communication between SSP 120 and remote SSP 140 takes place over trunk circuit 150. A node is any element of a telecommunications network that establishes voice or data links for the users of the network (i.e., a SSP, STP, etc.).

A network operator assigns each node within network 100 a point code. Elements within network 100 use point codes to identify the source and destination points of a message. Each node within network 100 identifies itself with an originating point code (OPC) and identifies other nodes within the network with a destination point code (DPC). The network operator also assigns a network identifier to network 100 to facilitate communication between network 100 and other networks.

There are a finite number of communication circuits between nodes in system 100. Circuit identification codes (CICs) are used to partially identify the communication channels between nodes. Networks employing the International Telecommunications Union Telecommunication Standardization Section (ITU-T)—Signaling System No. 7 (Q.761–Q.764 standard (ITU Standard) use a twelve bit CIC. Similarly, networks employing the American National Standards Institute—Signaling System No. 7 (T1.113) standard (ANSI Standard) use a fourteen bit CIC. Nodes using a twelve bit CIC are able to identify 4096 ($2^{12}$) communication channels and nodes using a fourteen bit CIC are able to identify 16,384 ($2^{14}$) communication channels.

The SS7 standard defines protocols that are used to implement basic call setup, management, and tear down. The protocols defined by the SS7 standard are divided into abstractions called levels. The SS7 levels loosely map to the Open Systems Interconnect (OSI) 7-layer model defined by the International Standards Organization (ISO).

Figure 2:
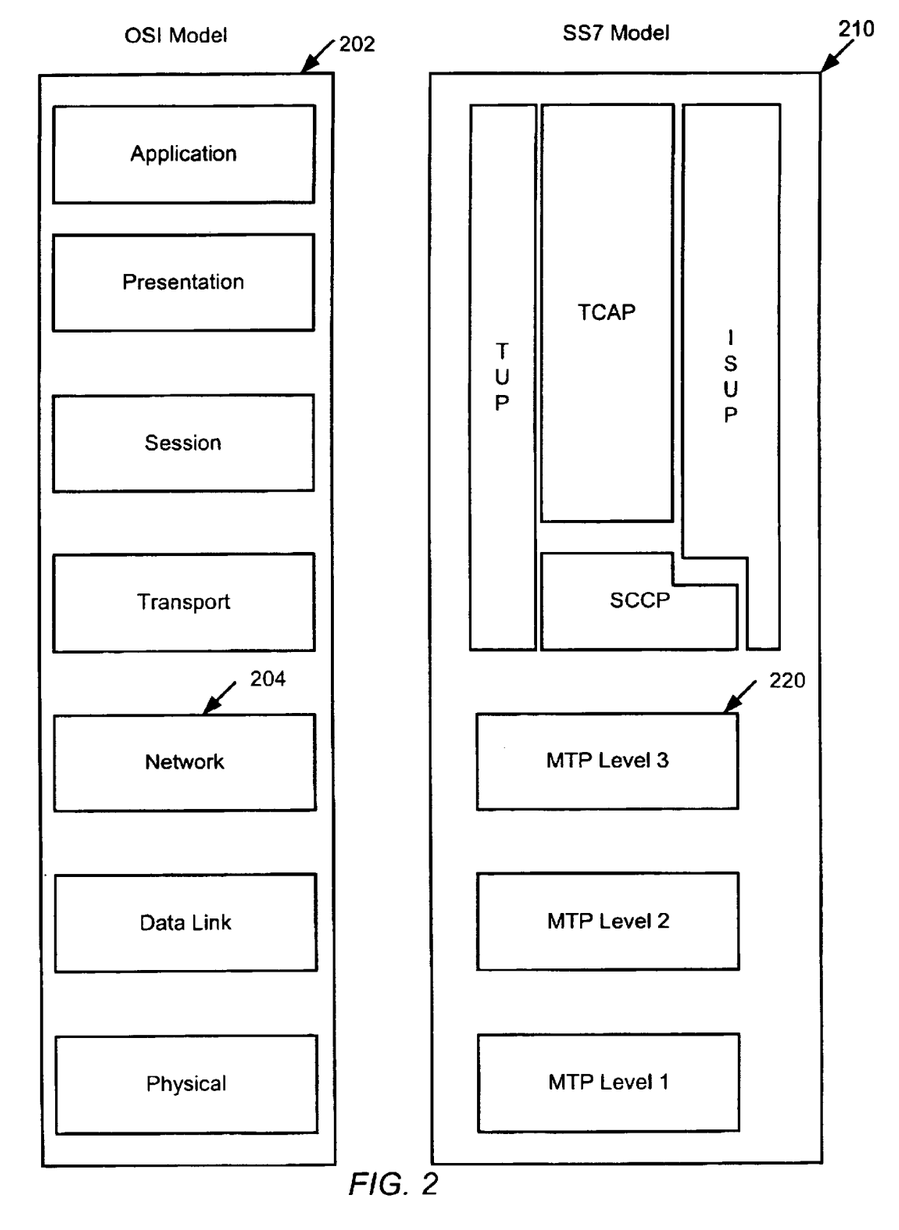
FIG. 2 shows a comparison of the OSI 7-layer model and the levels of the SS7 protocol.

FIG. 2 shows a comparison between the OSI 7-layer model and the SS7 levels. Integrated Services Digital Network User Part (ISUP) layer 210 manages connections between two SSPs. ISUP 210 implements call management by exchanging message signal units (MSUs) with the ISUP layer in a remote node. ISUP information is carried in the signaling information field (SIF) of the MSU. The SIF contains the OPC of the node sending the message and the DPC of the node that is the intended recipient of the MSU.

Message Transfer Part 3 (MTP3) layer 220 provides service to ISUP 210. MTP3 220 uses the routing information in a SIF to provide ISUP 210 with the OPC and DPC that identifies which node sent the MSU and which node is the intended recipient of the MSU. MTP3 220 also provides ISUP 210 with the CIC code that partially identifies the communication channel associated with the MSU.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

The detailed description uses a number of acronyms to refer to various protocol layers, system components, and messages. The use of some of these acronyms is not strictly standardized in the art. The acronyms used are defined as follows:

| | |
|---|---|
| American National Standards Institute | (ANSI) |
| Circuit identification code | (CIC) |
| Common Channel Signaling System No. 7 | (SS7) |
| Communication channel identifier agent | (CCIA) |
| Destination Point Code | (DPC) |
| Integrated Services Digital Network | (ISDN) |
| Interface Identifier | (IntfID) |
| ISDN User Part | (ISUP) |
| Message signal unit | (MSU) |
| Message transfer part 3 | (MTP3) |
| Network Identifier | (NetID) |
| Network Type | (NT) |
| Origination point code | (OPC) |
| Service Access Point | (SAP) |
| Service switching point | (SSP) |
| Signaling information field | (SIF) |
| Signal transfer point | (STP) |

Embodiments of a system and method for identifying communication channels between nodes in a network are described in detail herein. In the following description, numerous specific details are provided in order to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 3:
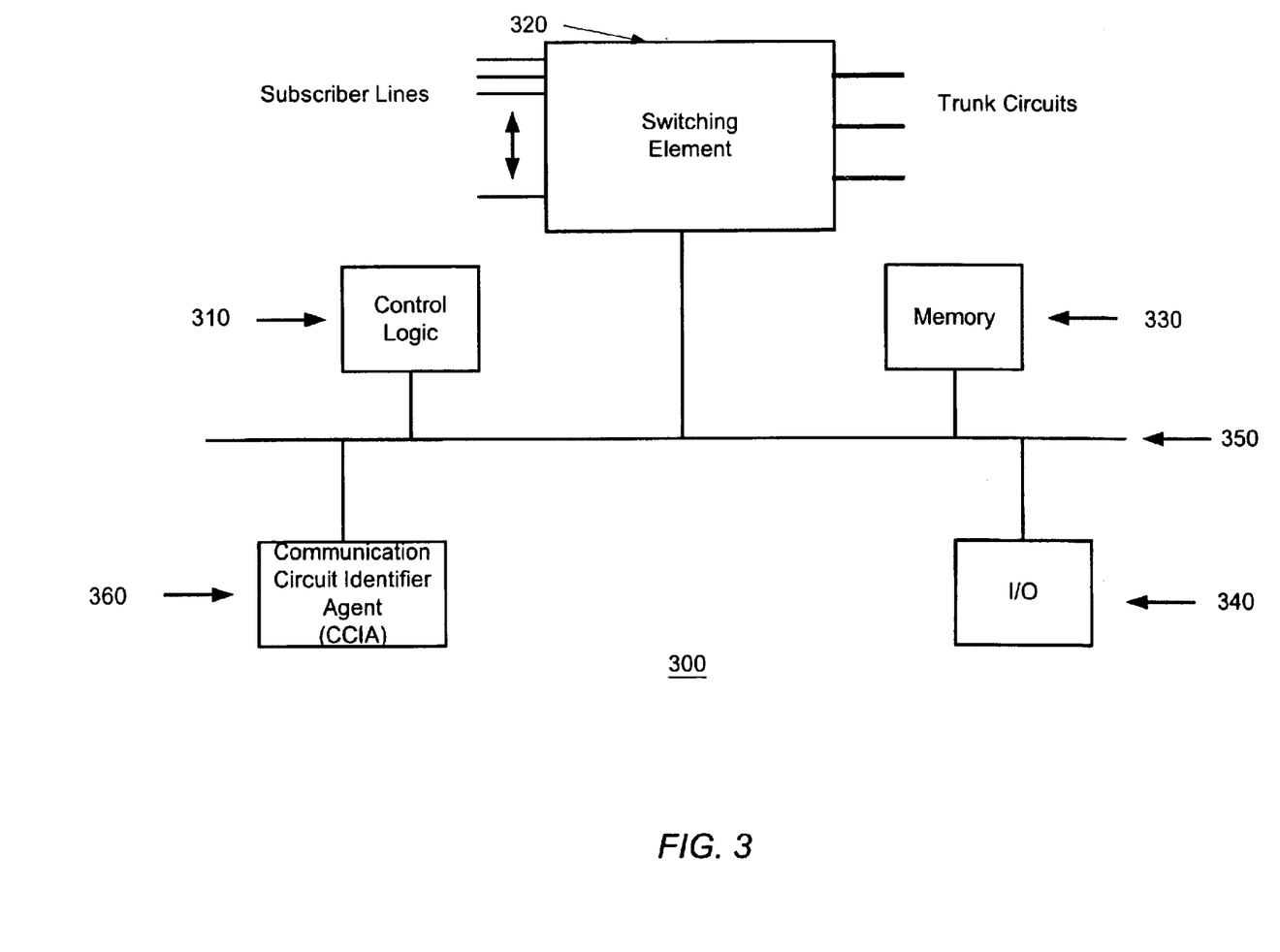
FIG. 3 illustrates portions of an SSP shown in FIG. 1.

FIG. 3 is a block diagram of SSP 300. For ease of illustration, SSP 300 may be divided into five blocks: control logic 310, memory subsystem 330, one or more input/output (I/O) units 340, switching element 320, and communication channel identifier agent CCIA 360. These blocks are coupled to each other by one or more data/instruction channels 350. Switching element 320 provides terminals for subscriber lines serviced by the SSP and couples voice communication from the subscriber lines to the trunk lines that typically connect SSP 300 with remote SSPs (not shown). Although depicted as five blocks, those skilled in the art will appreciate that the invention may be practiced with network elements of greater or lesser complexity.

Data or instructions may be stored in memory subsystem 330. The control logic 310 receives data stored in memory subsystem 330 and processes the data as directed by a set of instructions. In this way, control logic 310 effectively controls switching element 320. Control logic 310 represents a broad category of control logic including microprocessors, microcontrollers, field programmable gate arrays, programmable logic arrays, etc.

Communication channel identifier agent (CCIA) 360 provides an identifier for each communication channel that is in use between the SSP and another node. As used herein, communication channels are communication circuits between nodes (e.g., trunk circuits). In one embodiment, CCIA 360 receives two or more point codes to identify SSP 300 from a network operator (not shown). SSP 300 also receives at least one point code that is associated with another SSP (not shown) that seeks to establish a communication channel with SSP 300. CCIA 360, in an embodiment, generates a separate identifier for each point code that is associated with SSP 300. In one embodiment, CCIA 360 identifies a communication channel between SSP 300 and another SSP with an identifier that includes one of the point codes associated with SSP 300 and a point code that is associated with the other SSP.

In one embodiment of the invention, CCIA 360 is embodied as control logic, for example, an application specific integrated circuit (ASIC), programmable logic array (PLA), field programmable gate array (FPGA), controller, etc. In another embodiment, CCIA 360 is executable content. CCIA 360 is stored in memory subsystem 330 in some embodiments. The trunk circuits of switching element 320, in some embodiments, provide the communication channels between SSPs.

Figure 4:
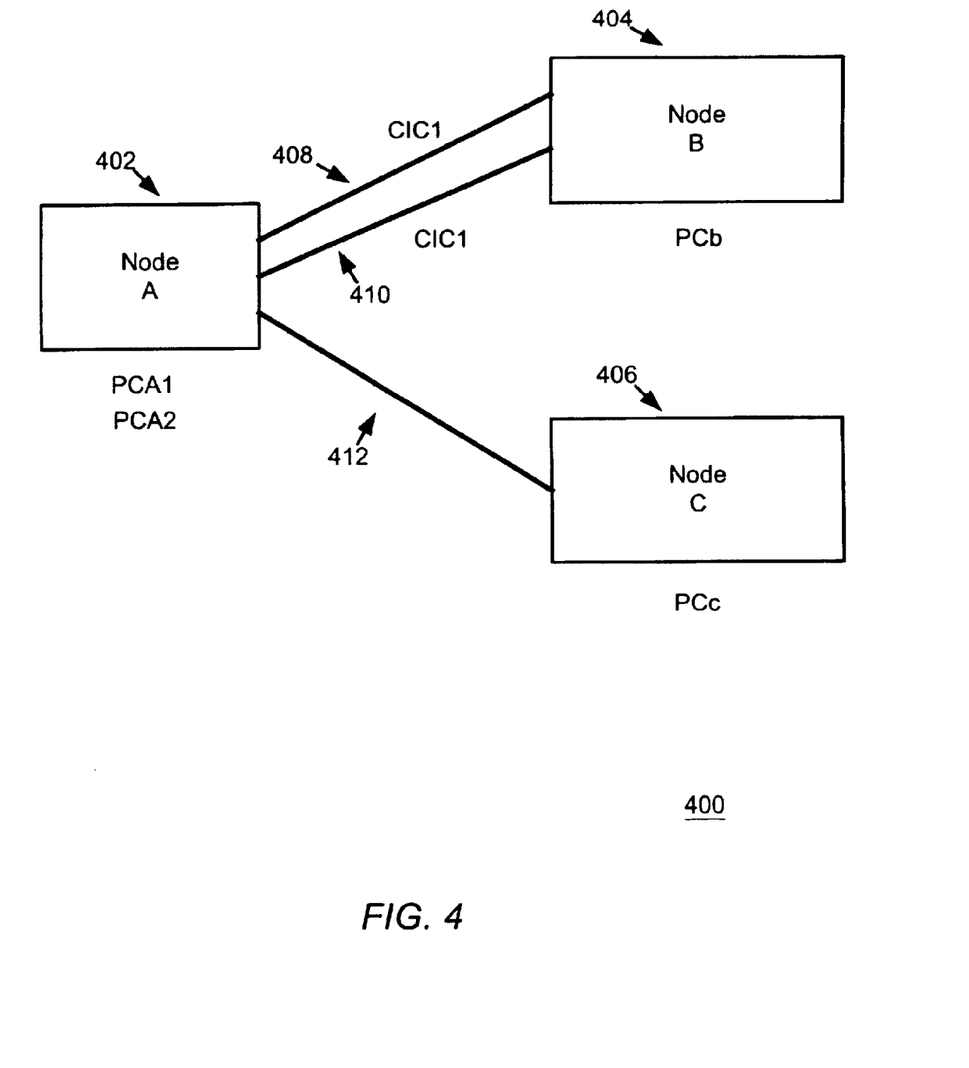
FIG. 4 illustrates three Nodes connected by a network.

FIG. 4 is a block diagram of three SSPs connected together in network 400. In conventional networks, a network operator (not shown) assigns each node an originating point code (OPC) during an initialization or maintenance interval. For example, in FIG. 4 an operator assigns Node B an OPC of PCb. Using conventional techniques, Node A identifies a channel between it and Node B with a combination of Node B's OPC (PCb) and a CIC (CIC1). A twelve bit CIC only has 4096 (2^12) permutations. Thus, in a conventional ITU-T network, Node A can only establish 4096 channels with Node B.

CCIA 360 provides a means for Node A to identify virtually any number of channels between Node A and Node B. The network operator may assign two or more OPCs to Node A (i.e., PCA1 and PCA2). Alternatively, a management application executing on the SSP, may automatically provision the point codes based, for example, on loading. CCIA 360 instructs the ISUP layer residing on Node A to use both PCA1 and PCA2 to identify Node A in communications with Node B. In one embodiment, CCIA 360 is integrated into the executable content used to implement an ISUP layer.

Figure 5:
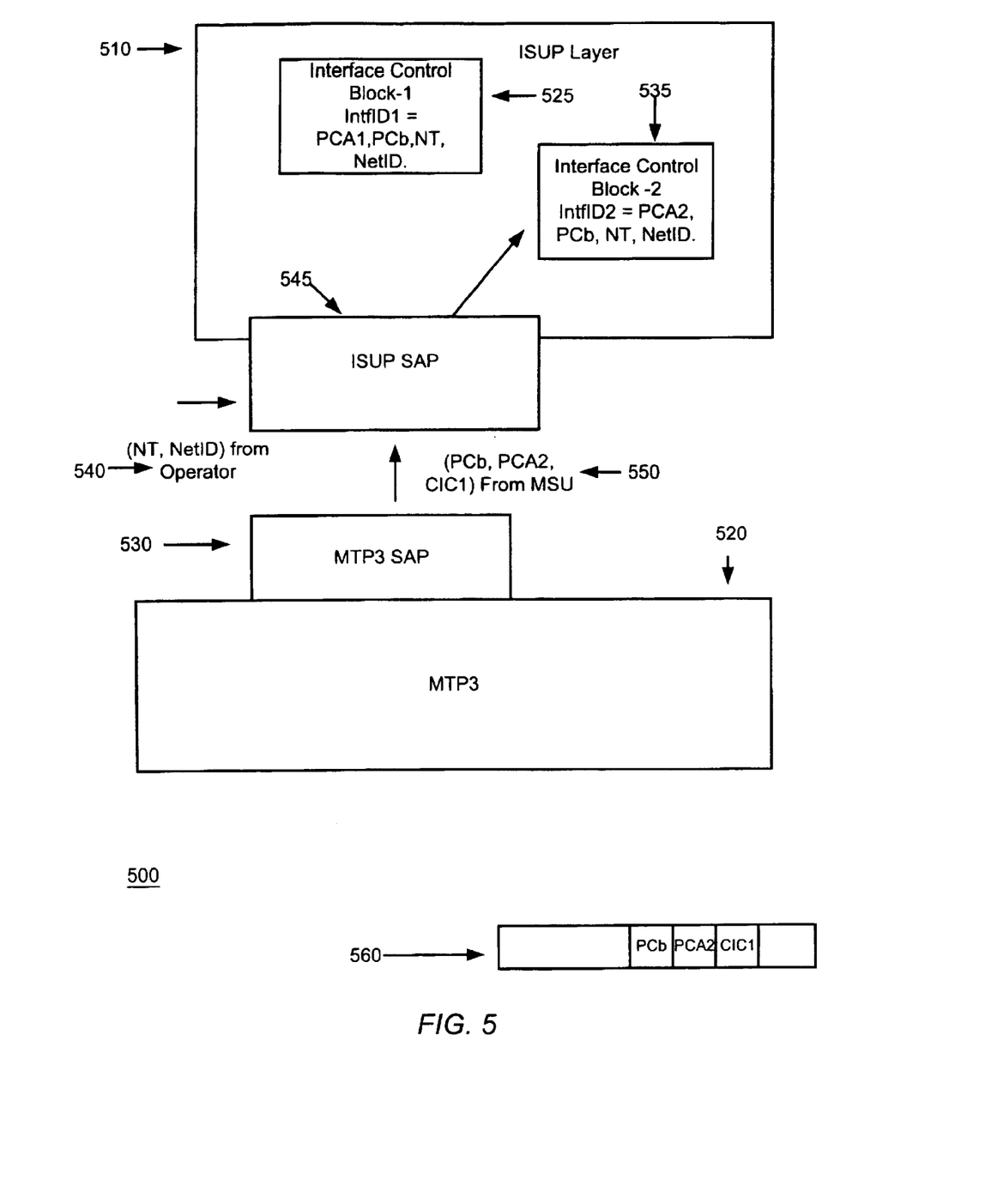
FIG. 5 is a conceptual illustration of the ISUP and MTP3 layers of Node A shown in FIG. 4.

FIG. 5 is a conceptual illustration 500 of the ISUP and MTP3 layers of Node A. CCIA 360 receives two originating point codes (OPCs), PCA1 and PCA2, to identify Node A. CCIA 360 directs ISUP layer 510 to create two interface control blocks, one for each OPC, to control the traffic between Node A and Node B.

Node B sends a message signal unit (MSU) to Node A at 560. Each MSU sent from Node B to Node A contains an OPC, DPC, and CIC. For an MSU originating from Node B, the OPC is PCb and the DPC is one of PCA1 or PCA2. MSU 560 has a DPC of PCA2.

MTP3 layer 520 provides the received OPC, DPC, and CIC to ISUP layer 510 from service access point (SAP) 530. The network operator (not shown) provides a network type (NT) and network identifier (NetID) to ISUP layer 510 at the ISUP layer's SAP 540. CCIA 360, in one embodiment, stores the NetID and NT in both Interface Control Blocks. In one embodiment, CCIA 360 stores the OPC in the Interface Control Block that matches the DPC of MSU 560. For example, CCIA 360 stores PCb in Interface Control Block 2 because MSU 560 contains a destination point code (DPC) of PCA2.

In one embodiment, CCIA 360 uses the OPC, DPC, NT, and NetID to create an interface identifier (IntfID). Because ISUP layer 510 is employing two OPCs, CCIA 360 creates two IntfIDs. IntfID1 is created from the combination of PCA1, PCb, NT, and NetID and IntfID2 is created from the combination of PCA2, PCb, NT, and NetID.

The invention does not require that an interface identifier (IntfID) be composed of an OPC, DPC, NT, and NetID. Some embodiments of the invention use less information in an IntfID and other embodiments use more information in an IntfID. CCIA 360 employs a combination of an IntfID and a circuit identification code (CIC) to identify a communication channel. Because CCIA 360 uses a combination of an IntfID and a CIC to identify a communication channel between Node A and Node B, CCIA 360 allows node A to greatly increase the number of channels that exist between the two nodes.

FIG. 5 provides a conceptual illustration 500 of identifying a communication channel between Node A and Node B. Node B sends MSU 560 to Node A requesting a communication channel between Nodes A and B. MTP3 layer 520 provides the OPC, DPC, and CIC from MSU 560 to ISUP layer 510 at 550. CCIA 360 uses the OPC, DPC, and CIC received from MTP3 520 and the NT and NetID received from the operator to find an interface control block that matches the parameters. Since Node B sent the message to PCA2, CCIA 360 selects interface control block 2 as the interface control block that matches Node B's request. In one embodiment, Node A establishes a communication channel with Node B and identifies that communication channel with a combination of IntfID2 and CIC1.

Figure 6:
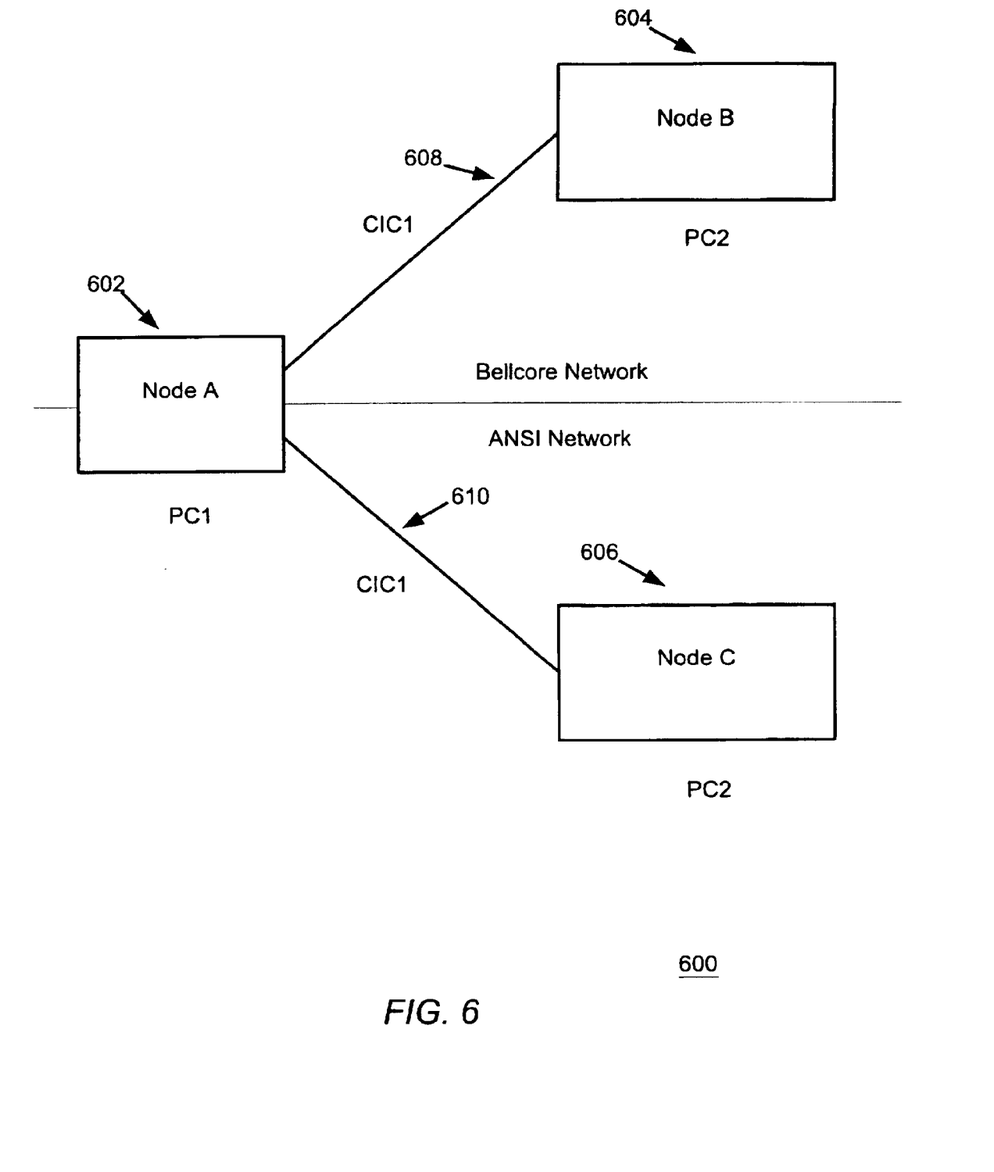
FIG. 6 illustrates gateway Node A connected to two Nodes in two different networks.

FIG. 6 is a block diagram 600 illustrating a gateway node connecting two disparate networks. Node B is in a Bellcore network and Node C is an ANSI network. Node 602 is a gateway node connecting the Bellcore and ANSI networks. The Bellcore network is not managed by the same operator as the ANSI network. Because the Bellcore and ANSI networks are separately managed, the operators for each network assign the same point code (PC2) to Nodes 604 and 606. A Conventional ISUP layer residing in Node 602 is unable to identify a communication channel between Node 602 and Nodes 604 or 606 because the combination of CIC1 and PC2 does not uniquely identify a communication channel between the nodes.

Figure 7:
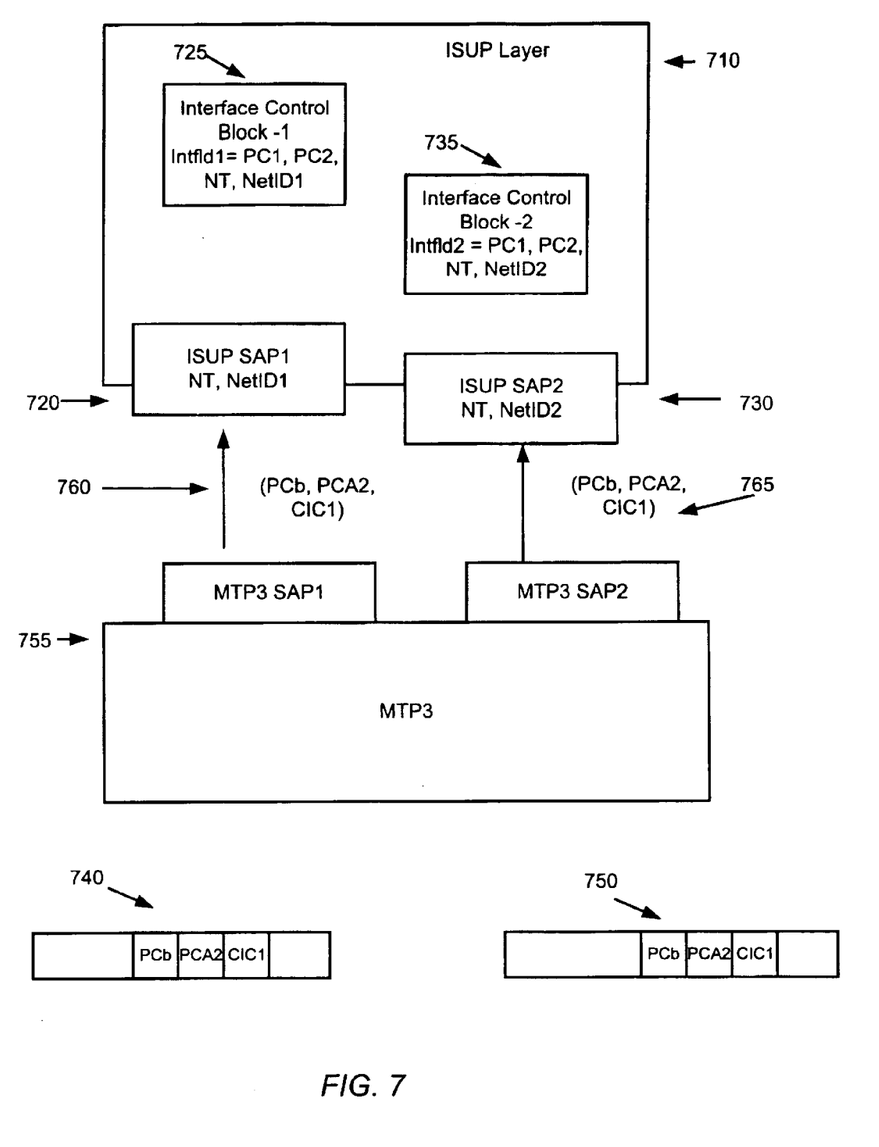
FIG. 7 illustrates portions of Node A shown in FIG. 6.

FIG. 7 is a conceptual illustration of the ISUP and MTP3 layers of Node A according to one embodiment of the invention. Node A's ISUP and MTP3 layers have separate service access points (SAPs) for each distinct network with which Node A is connected, in one embodiment. In FIG. 7, SAP 1 is associated with the Bellcore network and SAP 2 is associated with the ANSI network. The Bellcore network sends its NetID and network type to ISUP layer 710 at 720. Similarly, the ANSI network sends its NetID and network type to ISUP layer 710 and 730. CCIA 360 directs ISUP layer 710 to create two interface control blocks, one for each NetID, to control the traffic between Node A and Nodes B and C, in one embodiment of the invention.

FIG. 7 illustrates an embodiment that enables Node A to support communication channels with Nodes B and C even though Nodes B and C have identical OPCs and CICs. Node B sends MSU 740 to Node A. Similarly, Node C sends MSU 750 to Node A. MSUs 740 and 750 each include an OPC (PC2), DPC (PC1), and CIC (CIC1). Message transfer part 3 (MTP3) layer 755 provides the OPCs, DPCs, and CICs to ISUP layer 710 at 760 and 765.

CCIA 360 uses the data provided by MTP3 layer 755 and the network operators to associate MSU 740 and MSU 750 with Interface Control Block 1 and Interface Control Block 2, respectively. Interface Control Block 1 contains IntfID1 and Interface Control Block 2 contains IntfID2. In one embodiment, IntfID1 includes PC1, PC2, NT, and NetID1 and IntfID2 includes PC1, PC2, NT, and NetID2.

CCIA 360 employs IntfID1 and CIC1 to identify a communication channel between Node A and Node B. Similarly, CCIA 360 uses IntfID2 and CIC1 to identify a communication channel between Node A and Node C. IntfID1 and IntfID2 allow Node A to uniquely identify communication channels between Node A and Nodes B and C. Thus, CCIA 360 allows Node A to establish communication channels with Nodes B and C.

Figure 8:
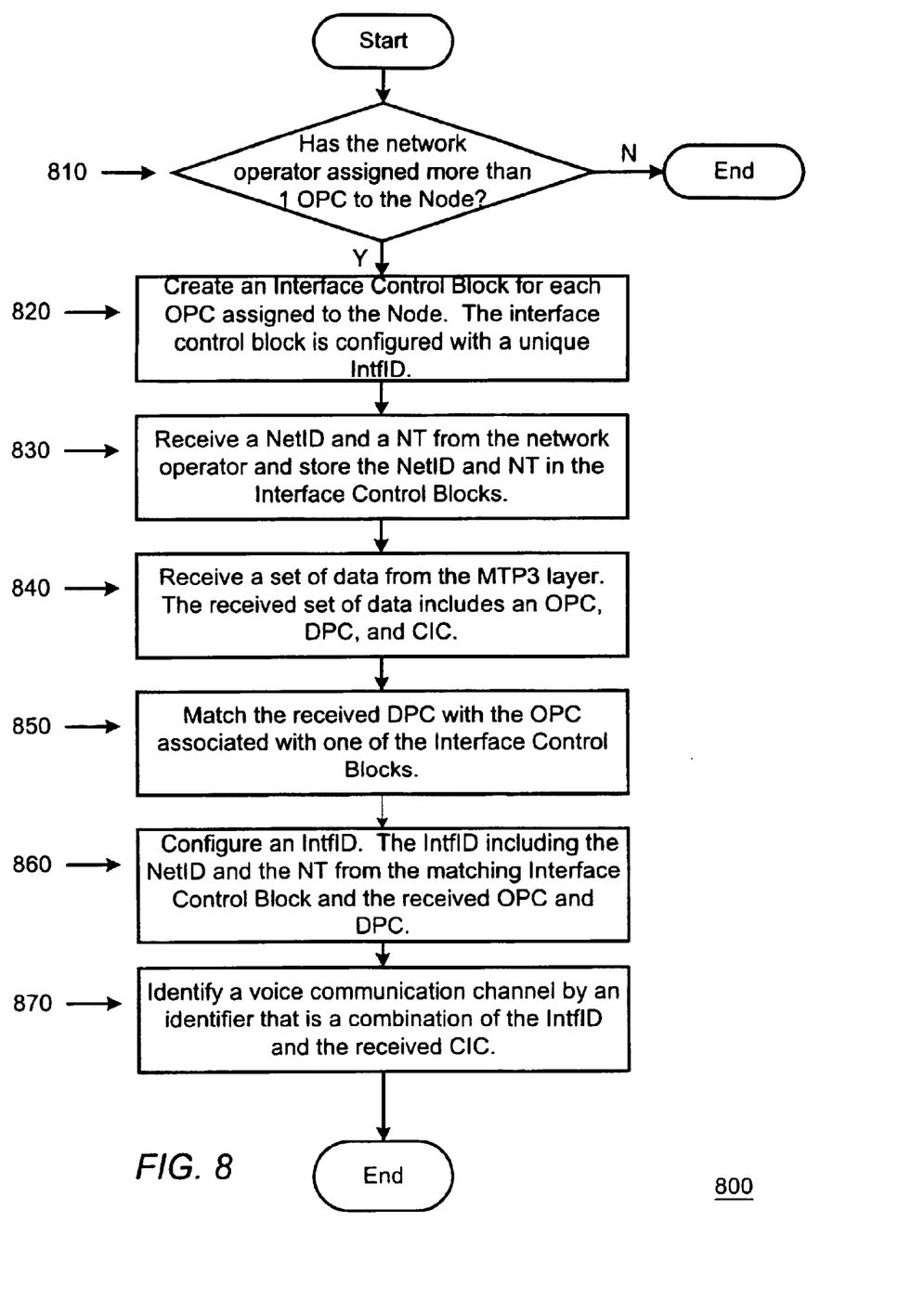
FIG. 8 is a flow diagram illustrating the process of identifying communication channels according to one embodiment of the invention.

FIG. 8 is a flow diagram illustrating the process of identifying communication channels according to one embodiment of the invention. In block 810, CCIA 360 determines whether Node A's network operator has assigned more than one OPC to Node A. If so, CCIA 360 creates an Interface Control Block for each OPC assigned to Node A at block 820. In block 830, CCIA 360 receives a NetID and NT from the network operator and stores that information with the Interface Control Blocks created in block 820.

Node B sends Node A an MSU requesting a communication channel between Node A and Node B. The SIF field of the MSU contains an OPC, DPC, and CIC. In block 840, Node A's MTP3 layer provides Node A's ISUP layer with the OPC, DPC and CIC from the MSU. The received DPC specifies one of the point codes assigned to Node A. CCIA 360 matches the received DPC to one of Node A's OPCs stored within one of the Interface Control Blocks at 850.

In block 860, CCIA 360 is configured with an IntfID to support a communication channel between Node A and Node B. The IntfID includes the NetID and NT from the matching Interface Control Block and the received OPC and DPC. CCIA 360 creates an identifier to identify a communication channel between Node A and Node B at block 870. The identifier is a combination of the IntfID and the received CIC. The IntfID includes one of the OPCs assigned to Node A by its operator. Thus, in the embodiment of the invention described in FIG. 8, Node A is not limited to the number of permutations of a twelve bit CIC, to identify communication channels.

Figure 9:
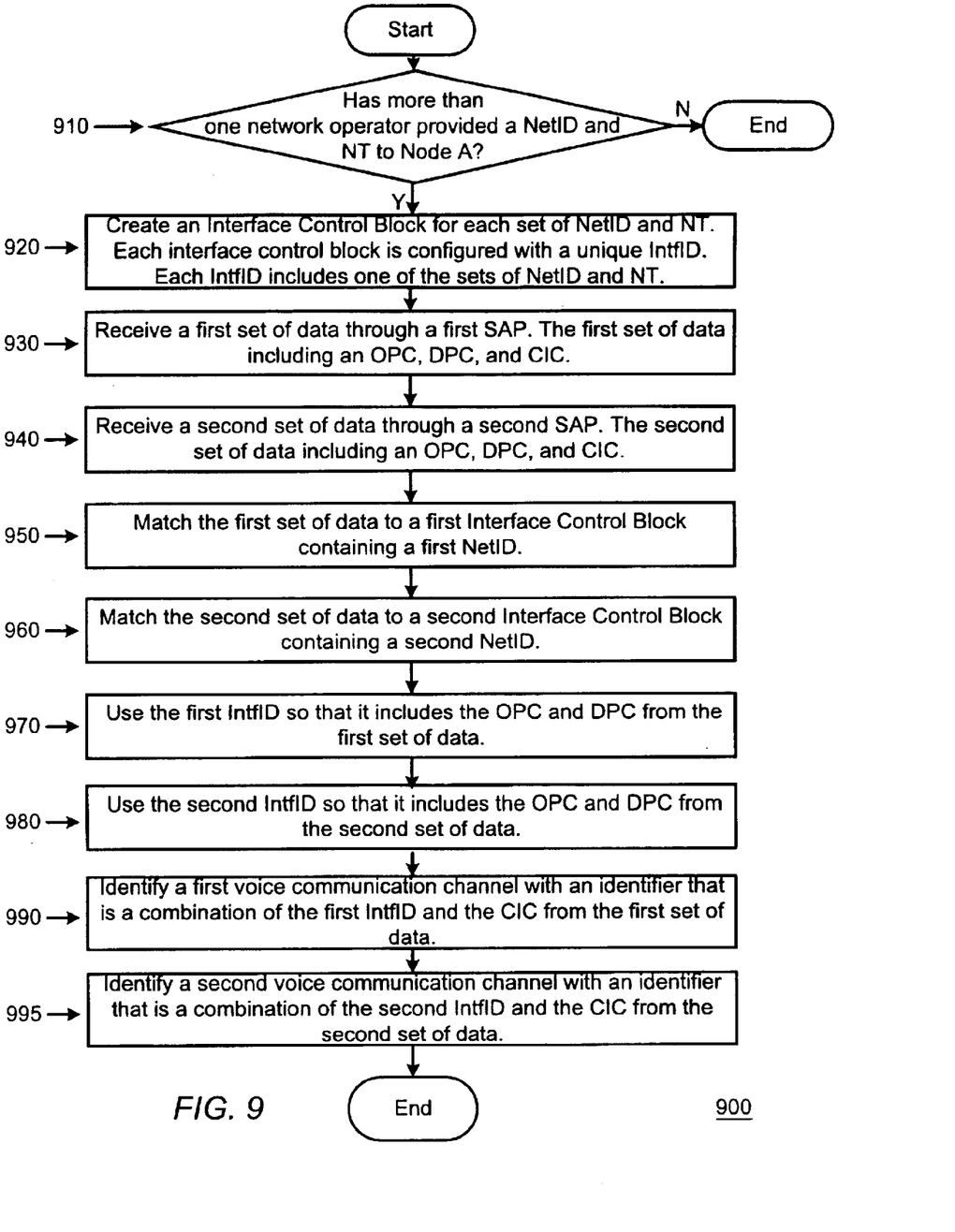
FIG. 9 is a flow diagram illustrating the process of identifying communication channels according to another embodiment of the invention.

FIG. 9 is a flow diagram illustrating the process of identifying communication channels according to another embodiment of the invention. Node A is a gateway node, in some embodiments, that is connected to exemplary Nodes B and C. Nodes B and C are part of separate networks and are managed by different operators. In block 910, CCIA 360 determines whether more than one network operator has provided Node A's ISUP layer with a NetID and NT, as Node A is working as a gateway between both networks. CCIA 360 creates an Interface Control Block for each set of NetID and NT that is provided to Node A at 920. Nodes B and C each send an MSU to Node A requesting that communication channels be established between Node A and Nodes B and C. The MSUs that Nodes B and C send to Node A each contain an SIF field, in one embodiment. The SIF fields contain an OPC, DPC, and CIC.

In process block 930, CCIA 360 receives the OPC, DPC, and CIC sent to Node A from Node B. Similarly, CCIA 360 receives the OPC, DPC, and CIC sent to Node A from Node C at 940. In one embodiment, Node A's ISUP layer has a separate SAP for each distinct network with which Node A is connected. CCIA 360 matches the received sets of data with the Interface Control Blocks that have been created for each network at 950 and 960.

In process block 970, CCIA 360 is configured with a first IntfID to support a communication channel between Node A and Node B. Similarly, CCIA 360 is configured with a second IntfID to establish a communication channel between Node A and Node C at 980. In one embodiment, each IntfID includes a NetID, NT, OPC, and DPC. The first IntfID includes Node B's NetID and the second IntfID includes Node C's NetID. Thus, even if Node B and Node C were assigned the same OPC, the IntfIDs for Node B and Node C would be different. CCIA 360 employs the first and second IntfIDs and the corresponding CICs to identify the communication channels established between Node A and Nodes B and C at 990 and 995.

An ISUP layer can be controlled by instructions from an electronically accessible medium, which may be used to program a computer (or other electronic devices) to perform a process described herein. The electronically accessible medium may include, but is not limited to, floppy diskettes, optical disks, CD-ROMs, magneto-optical disks, ROMs, RAMs, EPROMs, EEPRPOMs, magnet or optical cards, flash memory, or other type of media/machine-readable medium suitable for storing electronic instructions. Moreover, the instructions may also be downloaded as a computer program product, wherein the program may be transferred from a remote computer to a requesting computer by way of data signals embodied in a carrier wave or other propagation medium via a communication link (e.g., a modem or a network connection).

The above description of illustrated embodiments of the invention, including what is described in the abstract, is not intended to be exhaustive or to limit the invention to the precise forms disclosed. While specific embodiments of and examples for, the invention are described herein for illustrative purposes, various equivalent modifications are possible within the scope of the invention, as those skilled in the relevant art will recognize. Those skilled in the art will appreciate that inasmuch as the interface identifier is generated as the ISUP layer, it is independent of the physical media through which the channel is created. Thus, the teachings of the present invention are readily implemented in wired or wireless communications systems.

What is claimed is:

1. A network comprising:
   a first node having a first point code, and a first switching element to selectively couple the first node to other nodes through one or more communication channels; and a second node having a second point code, a third point code, and a second switching element to establish a first communication channel with the first node, the second node to identify the first communication channel with an identifier that includes, at least, the first point code and one of the second point code and the third point code.

2. The network of claim 1, wherein the first node and the second node further comprise a network identifier to identify the network.

3. The network of claim 2, wherein the second node is to identify the communication channel with the identifier that further includes the network identifier.

4. The network of claim 1, wherein the second node establishes a second communication channel with the first node, identified by a second identifier that includes the first point code and another one of the second point code and the third point code.

5. The network of claim 4, wherein the second identifier further includes the network identifier.

6. The network of claim 5, wherein the second node has a second network identifier to identify a second network, and establishes a third communication channel identified by an identifier that includes either the second point code or the third point code and the second network identifier.

7. The network of claim 6, wherein the second node implements Common Channel Signaling System No. 7(SS7) protocols to manage one or more of the first, second, or third communication channels.

8. The network of claim 7, wherein an Integrated Services Digital Network User Part (ISUP) layer residing on the second node creates the second and third identifiers to identify the second and third communication channels.

9. A node comprising:
a switching element to selectively couple the node to a communication channel with an other node; and
a communication channel identifier agent (CCIA) coupled to the switching element to identify the communication channel, the CCIA including two or more origination identifiers, the two or more origination identifiers to identify the node, and a destination identifier, the destination identifier to identify the other node, the CCIA to use at least one of the two or more origination identifiers and the destination identifier to identify the communication channel.

10. The node of claim 9 wherein, the origination identifiers are originating point codes (OPCs), the destination identifier is a destination point code (DPC), and the CCIA creates an interface identifier, the interface identifier including, at least, one of the one or more OPCs and the DPC.

11. The node of claim 10 wherein the interface identifier further includes a network identifier, the network identifier to identify a network to which the switching element is to connect.

12. The node of claim 11 wherein the CCIA is to identify a communication channel from the node to the other node, with an identifier that represents a combination of the interface identifier and a circuit identification code (CIC).

13. A method comprising:
creating a first interface identifier, the first interface identifier representing at least a first origination identifier to identify a first node and a destination identifier to identify a second node;
combining the first interface identifier with a circuit identification code (CIC) to identify a communication channel between the first node the second node;
creating a second interface identifier, the second interface identifier representing at least a second origination identifier to identify the first node and the destination identifier to identify the second node; and
combining the second interface identifier with the CIC to identify a second communication channel between the first node and the second node.

14. The method of claim 13 wherein the first interface identifier further includes a first network identifier to identify a network containing the first node.

15. The method of claim 14 wherein the first node implements the Common Channel Signaling System No. 7 (SS7) protocols to manage the first communication channel and the second communication channel; and
the first and second origination identifiers are originating point codes and the destination identifier is a destination point code.

16. The method of claim 15 further comprising:
creating a third interface identifier, the third interface identifier including at least one of the two originating point codes (OPCs) designating the first node, a second destination point code (DPC) designating a third node, and a second network identifier to identify a network containing the third node; and
combining the third interface identifier with the CIC to identify a third communication channel between the first node and the third node.

17. The method of claim 16 wherein the first node implements the SS7 protocols to manage the third communication channel.

18. A method comprising:
receiving two or more origination identifiers to identify a node;
receiving a destination identifier to identify an other node; and
generating an interface identifier to identify a communication channel between the node and the other node, the interface identifier representing one of the two or more origination identifiers and the destination identifier.

19. The method of claim 18 further comprising:
receiving a circuit identification code (CIC); and
employing the interface identifier and the CIC to identify the communication channel between the node and the other node.

20. The method of claim 19 further comprising:
generating a second interface identifier, the second interface identifier including another one of the two or more origination identifiers and the destination identifier.

21. The method of claim 20 further comprising employing the second interface identifier and the CIC to identify a second communication channel between the node and the other node.

22. The method of claim 19 further comprising:
receiving a first network identifier to identify a first network and a second network identifier to identify a second network;
generating a second interface identifier, the second interface identifier including one of the two or more origination identifiers, the destination identifier, and the second network identifier; and
employing the second interface identifier and the CIC to identify a communication channel between the node and a node in the second network.

23. The method of claim 22 wherein the node is implementing the Common Channel Signaling System No. 7 (SS7) protocols to manage the communication channels; and the origination identifiers are originating point codes and the destination identifier is a destination point code.

24. The method of claim 23 wherein an Integrated Services Digital Network User Part (ISUP) layer residing on the node employs the second interface identifier and the CIC to identify the communication channel between the node and the node in the second network.

25. An article of manufacture comprising:

an electronically accessible medium providing instructions, that when executed by one or more processors, cause the one or more processors to receive two or more origination identifier identifiers to identify a node;

receive a destination identifier to identify an other node; and generate an interface identifier, the interface identifier including one of the two or more origination identifiers and the destination identifier.

26. The article of manufacture of claim 25, wherein the electronically accessible medium providing instructions, that when executed by one or more processors cause the one or more processors to receive a circuit identification code (CIC); and employ the interface identifier and the CIC to identify a communication channel between the node and the other node.

27. The article of manufacture of claim 26, wherein the electronically accessible medium providing instructions, that when executed by one or more processors cause the one or more processors to generate a second interface identifier, the second interface identifier representing another one of the two or more origination identifiers and the destination identifier.

28. The article of manufacture of claim 26 wherein the electronically accessible medium providing instructions, that when executed by one or more processors cause the one or more processors to receive a first network identifier to identify a first network and a second network identifier to identify a second network;

generate a second interface identifier, the second interface identifier including one of the two or more origination identifier, the destination identifier, and the second network identifier; and employ the second interface identifier and the CIC to identify a communication channel between the node and a node in the second network.

* * * * *